Nov. 9, 1948.  H. E. WRIGHT, JR  2,453,174
SEALING AND POTTING COMPOSITION CONSISTING OF
TRI(P-TERTIARY BUTYL PHENYL) PHOSPHATE AND
COUMARONE-INDENE RESIN
Filed Nov. 15, 1945
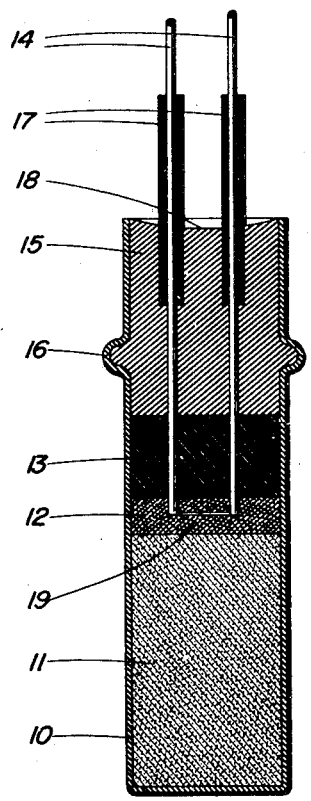
INVENTOR
HOWARD E. WRIGHT, JR.
BY Ralph L. Chappell
ATTORNEY Patented Nov. 9, 1948

2,453,174

UNITED STATES PATENT OFFICE 2,453,174

SEALING AND POTTING COMPOSITION CONSISTING OF TRI(P-TERTIARY BUTYL PHENYL) PHOSPHATE AND COUMARONE-INDENE RESIN

Howard Edwards Wright, Jr., Silver Spring, Md.

Application November 15, 1945, Serial No. 628,955

2 Claims. (Cl. 260—30.6)

(Granted under the act of March 3, 1883, as amended April 30, 1928; 370 O. G. 757)

This invention relates to sealing and potting compounds and has particular relation to a novel sealing and potting compound for use in electrical devices such as electric detonators which are also known in the art as blasting caps, primers, fuzes, and igniters.

An object of the present invention is to provide a sealing and potting compound which is particularly adapted for use with electrical devices such as electric detonators and the like.

Another object of the invention is to provide a sealing and potting compound which will obviate the use of the conventional sealing agent sulphur in electrical devices such as electric detonators and the like.

Still another object of the invention is to provide a sealing and potting compound which possesses the following desirable properties:

(a) Odorless.
(b) Non-inflammable.
(c) Non-toxic.
(d) Non-volatile.
(e) Non-corrosive.
(f) Waterproof.
(g) Moisture-vapor proof.
(h) Unaffected by heat at 170° F.
(i) Non-irritating.
(j) Adherence to porous and non-porous surfaces.
(k) Excellent pour properties.
(l) Ease of application.
(m) Good wetting properties.
(n) Tasteless.
(o) No tendency to pull away from metal parts.

A further object of the invention is to provide an electric detonator provided with the sealing and potting compound of the present invention.

These and other objects of the invention will be better understood by reference to the following description and accompanying drawing.

Conventional electric detonators, examples of which are shown in U. S. Patents 1,960,591, 2,363,-254 and 2,363,863, have for many years employed sulphur as a sealing compound. Electric detonators of this type ordinarily comprise a metal casing containing a detonating charge and one or more electrical wires leading from the detonating charge to an exterior current source. The sulphur sealing compound, commonly referred to as a sulphur plug, is poured in a melted condition into the top open end of the casing and upon solidification serves to surround the electric wires, close the top of the casing and to position and maintain the electric wires in the casing.

Although sulphur has been used as a sealing compound since the inception of electric detonators, it possesses a number of properties which are not desirable for its use as a sealing agent and among which are the following:

(a) Slightly corrosive to metal.
(b) Lacks wetting properties.
(c) Lacks adherence and tenacity to metallic surfaces.
(d) Evolves irritant and toxic fumes when in a molten condition.
(e) Inflammable and combustible in certain mixtures.
(f) Tends to assume a convex type of meniscus upon solidification thereby resulting in a tendency to pull away from the sides of a container such as a detonator casing.
(g) Lacks good waterproofing properties.
(h) Lacks good moisture-vapor proof properties.

I have found that tri(p-tertiary-butyl phenyl) phosphate or a mixture comprising a major proportion of tri(p-tertiary-butyl phenyl) phosphate and a minor proportion of coumarone-indene resin may be advantageously used as a sealing and potting compound, particularly as a sealing agent for use with electric detonators.

Tri(p-tertiary-butyl phenyl) phosphate, is a member of the group of the triaryl phosphates which are phosphoric esters. The preparation of phosphoric esters, which are generally liquid in character, is described in U. S. Patent 1,425,392. In general the phosphoric esters are viscous oily liquids at ordinary temperatures and they are commonly used as softening agents or plasticizers. The preparation and use of certain triaryl phosphates, which class includes tri(p-tertiary-butyl phenyl) phosphate as one of the derivatives, is disclosed in U. S. Patent 2,071,323. This patent describes the preparation and certain properties of the triaryl phosphate, tri(p-tertiary-butyl phenyl) phosphate, which forms the subject matter of the present invention.

The compound tri(p-tertiary-butyl phenyl) phosphate is ordinarily used as a solvent, plasticizer, vehicle or modifier for such plastic materials as the cellulose esters and ethers, resins, rubber and the like. Some examples of the use of the triaryl phosphates are described in U. S. Patent 2,182,817 which states that a number of these compounds are crystalline solids at ordinary temperatures and that this property detracts somewhat from their utility as plasticizing agents. Another use of the aromatic esters of phosphoric acid as a fire extinguishing agent for preventing metallic fires is disclosed in U. S. Patent 2,307,083.

Referring to the drawings, one embodiment of the present invention is shown in the form of an electric detonator comprising a copper container 10 filled with a primary detonating charge 11, and igniter charge 12, a plug 13 of rubber or other plastic material, electric wires 14 connected to a source of electric current (not shown) and a sealing and potting compound 15 comprising by weight a major proportion of tri(p-tertiary-butyl phenyl) phosphate and a minor proportion of coumarone-indene resin. The igniting wire 19 is exposed to the igniter charge 12 and the wires 14 are positioned and retained by the inner plug 13 and the outer sealing and potting compound 15. The container 10 is provided adjacent its open end with a crimp 16 which serves to key the sealing and potting compound tri(p-tertiary-butyl phenyl) phosphate after it has become solidified. The outer exposed portions of the wires 14 are preferably insulated as at 17. The sealing and potting plug 15 forms a concave meniscus as indicated by the reference character 18 thus assuring maximum contact with the metallic sides of the detonator.

The method of sealing and potting electric detonators of the type shown in the drawing will now be described. The sealing and potting compound tri(p-tertiary-butyl phenyl) phosphate is heated slowly to its melting point, 215° F., and heating is continued until the compound has attained a temperature from 250 to 275° F. The compound tri(p-tertiary-butyl phenyl) phosphate, which has the appearance of a clear melt, is poured into the mouth of the copper container 10 around the wires 14 and onto the plug 13. The molten sealing and potting compound tri(p-tertiary-butyl phenyl) phosphate is allowed to cool and solidify. Upon solidification, the surface of the compound forms a concave meniscus rather than a convex meniscus as is the case with conventional sulphur. This concave meniscus is an advantageous feature of the invention inasmuch as it assures maximum contact with the metallic sides of the copper container 10.

*Example 1*

A suitable amount of tri(p-tertiary-butyl phenyl) phosphate is heated slowly to its melting point, 215° F., and heating is continued until the compound attains a temperature from 250–275° F. The melt is poured in the mouth of the copper container which is permitted to stand three or four hours during which time the molten sealant solidifies and sets. A number of tests were conducted to determine the properties of the sealing and potting compound of the present invention and of the electric detonators made in accordance with the present invention, including the following:

(a) *Volatility.*—Electric detonators made in accordance with the above were heated in an oven at 170° F. for 24 hour periods and it was found that they exhibited no loss in weight, thus indicating that the sealing agent of the present invention is non-volatile at temperature of the indicated range.

(b) *Corrosion and creeping.*—Electric detonators made in accordance with the present invention were heated in an oven at 170° F. for 24 hour periods and were subjected to long periods of standing at room temperatures. The electric detonators were examined for evidence of corrosive action, tendency to creep and for any other effects which heat would have on the sealing agent and the bond between the sealing agent and the copper detonator or the plastic plug. It was found that the sealing agent remained intact, showed no evidence of creeping and no evidence of corrosion or other harmful effect on the copper container.

(c) *Flammability.*—The compound tri(p-tertiary-butyl phenyl) phosphate was held in an open flame. The material melted and no ignition at all occurred until the temperature of thermal decomposition (509–527° F.) was reached, at which temperature spasmodic jets of flame occurred. Combustion did not continue when the molten substance was removed from the flame, contrary to the action of sulphur, which burns continuously even after removal from the flame. It was further noted that the flash did not burn continuously, being self-extinguishing. In this connection it may be noted that sulphur ignites readily at a temperature from 365–374° F.

(d) *Waterproofness and moistureproofness.*—Electric detonators having a desiccant comprising anhydrous CaSO4 were sealed with tri(p-tertiary-butyl phenyl) phosphate and immersed in distilled water at room temperature for eighteen days. Similar detonators sealed with sulphur were also subjected to this test. It was found that the containers sealed with tri(p-tertiary-butyl phenyl) phosphate gained only 2 milligrams in weight whereas the sulphur sealed detonators which were tested gained 10 milligrams in weight. There was no evidence of chemical activity at the junction of tri(p-tertiary-butyl phenyl) phosphate and the copper container whereas at the junction of the sulphur and copper container some corrosion of the copper was evidenced. Other similarly prepared detonators were placed in a humidity cabinet and subjected to 95% relative humidity at 100° F. for eighteen days. Those detonators sealed with tri(p-tertiary-butyl phenyl) phosphate exhibited an average of only 6 milligrams gain in weight at the end of this period, which gain in weight was partially due to corrosion of the outer surface of the copper detonator.

It was further observed that tri(p-tertiary-butyl phenyl) phosphate was odorless, non-toxic and tasteless. No irritant fumes were evolved during the process of heating it to a molten condition preparatory to the sealing process. It was heated and reheated without exhibiting any decomposition which is a further indication of its chemical stability. It exhibited a good adherence to non-porous surfaces and did not tend to pull away from the metallic sides of the detonator at temperatures up to and including 170° F. The agent tri(p-tertiary-butyl phenyl) phosphate exhibits considerable flexibility and cold resistance and sufficient strength to prevent the electric wires from cutting it up or breaking through it when they are subjected to lateral movement.

*Example 2*

Although the sealing and potting compound described in Example 1 above is satisfactory, a preferred composition is one containing a major proportion of tri(p-tertiary-butyl phenyl) phosphate and a minor proportion of coumarone-indene resin. One type of coumarone-indene resin which has been found satisfactory is that known as "R–12–S(hard)" a special grade possessing excellent solubility in highly paraffinic petroleum naphthas, and having a melting point range of 127–142° C. Mixtures of coumarone-indene resin in concentrations varying from 1 to 25% by weight with tri(p-tertiary-butyl phenyl) phosphate have been found to increase the adherence of the seal between the composition and the copper detonator. It is believed that coumarone-indene resin tends to act in the capacity of a binding agent and thereby yields a more tenacious seal than could otherwise be obtained. Coumarone-indene resin is completely and readily soluble in tri(p-tertiary-butyl phenyl) phosphate, is relatively odorless, tasteless, non-toxic, moisture impervious and non-inflammable.

It has been found that for concentrations of more than 3% by weight of coumarone-indene resin in tri(p-tertiary-butyl phenyl) phosphate, the time required for solidification of the melt increases progressively with an increase in concentration of coumarone-indene resin; whereas the addition of 3% or less of coumarone-indene resin does not lengthen the time required for the molten mixture to become solidified, the solidifying time varying from two to four hours.

A number of electric detonators were sealed and potted with a composition comprising 3% by weight of coumarone-indene resin in tri(p-tertiary-butyl phenyl) phosphate in the manner described in the preceding example. This composition and the electric detonators sealed and potted therewith were subjected to the tests described in the preceding example and it was found that the results were substantially identical with the exceptions that the adherence of the seal and the hardness of the sealing agent were improved.

Other electric detonators were sealed and potted with compositions comprising by weight from more than 3% to 25% of coumarone-indene resin in tri(p-tertiary-butyl phenyl) phosphate and they were subjected to the tests described in the foregoing examples. It was found that the results were only slightly less satisfactory than the results of the samples made in accordance with Examples 1 and 2 with the exception that the time required for solidification of the melted composition increased progressively with an increase in concentration of coumarone-indene resin in tri(p-tertiary-butyl phenyl) phosphate.

The invention herein described may be manufactured and used by or for the Government of the United States of America for governmental purposes without the payment of any royalties thereon or therefor.

I claim:

1. A composition for sealing and potting electrical devices which consists of 75 to 99 per cent of tri(p-tertiary-butyl phenyl) phosphate and 1 to 25 per cent by weight of coumarone-indene resin.

2. A composition for sealing and potting electrical devices which consists of 97 per cent of tri(p-tertiary-butyl phenyl) phosphate and 3 per cent by weight of coumarone-indene resin.

HOWARD EDWARDS WRIGHT, Jr.

REFERENCES CITED

The following references are of record in the file of this patent:

UNITED STATES PATENTS

| Number | Name | Date |
|---|---|---|
| 2,071,323 | Bass | Feb. 23, 1937 |
| 2,215,066 | Clark | Sept. 17, 1940 |
| 2,385,879 | Patton | Oct. 2, 1945 |

OTHER REFERENCES

Neville Resins and Plasticizers, The Neville Co.